Figure 1:
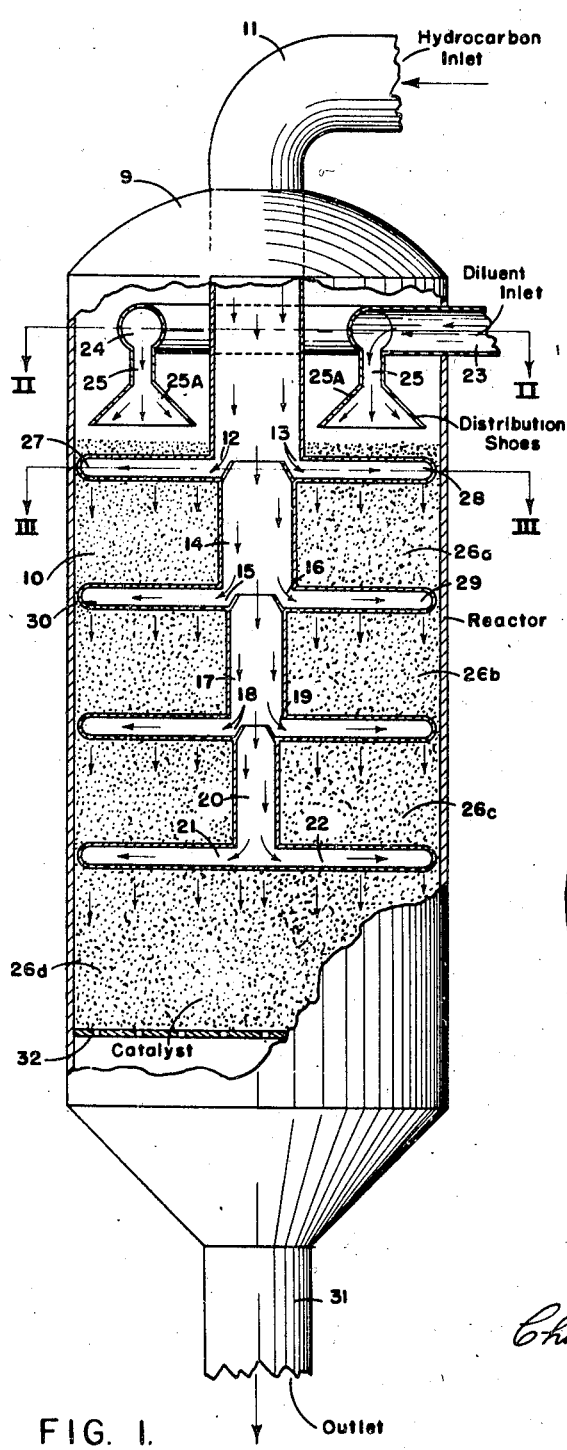

Feb. 8, 1949.  C. J. G. LEESEMANN  2,461,331
PROCESS FOR DEHYDROGENATION OF HYDROCARBONS
IN THE PRESENCE OF A GASEOUS DILUENT
Filed June 10, 1946

Charles J. G. Leesemann INVENTOR.

BY
J S McKean
ATTORNEY.

Patented Feb. 8, 1949

2,461,331

UNITED STATES PATENT OFFICE 2,461,331

PROCESS FOR DEHYDROGENATION OF HYDROCARBONS IN THE PRESENCE OF A GASEOUS DILUENT

Charles J. G. Leesemann, Baytown, Tex., assignor, by mesne assignments, to Standard Oil Development Company, Elizabeth, N. J., a corporation of Delaware Application June 10, 1946, Serial No. 675,809

10 Claims. (Cl. 260—680)

1

The present invention relates to improved methods for catalytically dehydrogenating hydrocarbons in the presence of a diluent.

In the catalytic dehydrogenation of hydrocarbons such as paraffins, olefins, or alkylated aromatics to produce the corresponding mono-olefins, diolefins, or aromatics having an unsaturated side chain, a diluent is usually employed in the reaction zone for several reasons. The presence of a diluent in the feed and product favors the equilibrium concentration of the product. A diluent serves to decrease side reactions occurring in the dehydrogenation reaction. The presence of a diluent also causes improved intimacy of contact between the hydrocarbon and the catalyst, permits a more uniform temperature in the reaction zone, and allows easier control of the dehydrogenation reaction. In addition, diluents such as steam react with carbon deposited on the catalyst at active dehydrogenation temperatures and thus serve to minimize the extent to which carbonaceous deposits are formed during the dehydrogenation reaction.

Studies carried out in the dehydrogenation of various hydrocarbons have shown that increasing the diluent to hydrocarbon ratio in the catalyst zone increases selectivity in the production of the desired dehydrogenated hydrocarbon. Therefore, increasing the diluent to hydrocarbon ratio in the reaction zone has the effect of producing an increased quantity of the desired dehydrogenation product from a given quantity of hydrocarbons if plant capacity or reactor capacity is available to accommodate the increased volume of material that must be passed over the catalyst.

When the reactor capacity is not available, it is necessary to sacrifice selectivity and conversion to obtain the desired production of dehydrogenation product by using additional amounts of hydrocarbon feed stock in the conventional type of dehydrogenation reactor.

The present invention embodies an improved dehydrogenation process which permits the employment of higher effective diluent to hydrocarbon ratios in the reactor without the necessity for providing either larger quantities of feed stock or reactor volume. In my process, increased selectivity to a desired dehydrogenation product may be obtained from a hydrocarbon feed stock by progressively decreasing the ratio of diluent to hydrocarbon as the mixture passes through the catalyst zone.

It is, therefore, the main object of my invention to dehydrogenate hydrocarbons in an operation

2 in which a progressively decreasing ratio of diluent to hydrocarbons is effected as the mixture passes through the catalyst zone and thereby obtain increased yields of a desired dehydrogenation product from a given amount of feed stock.

A more specific object of my invention is to carry out a dehydrogenation reaction in which the effective diluent to hydrocarbon ratio in the catalyst zone is considerably higher than would be obtained by employing the same amount of hydrocarbons and diluent in conventional types of dehydrogenation equipment.

Other and further objects of my invention will appear from the following more detailed description and claims.

The invention will be better understood by reference to the accompanying drawing which illustrates one embodiment of the process. A side sectional view of a reactor in which the dehydrogenation reaction may be effected is shown in Fig. 1.

Figure 2:
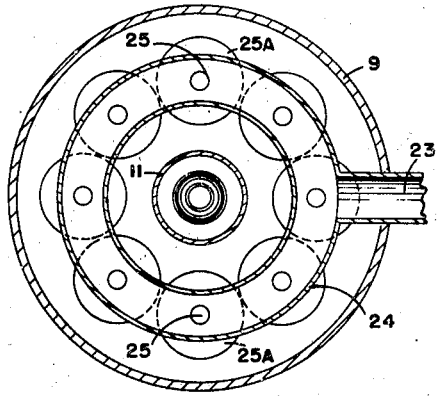

A top sectional view taken across the line II—II of the diluent inlet system to the dehydrogenation reaction zone is shown in Fig. 2.

Figure 3:
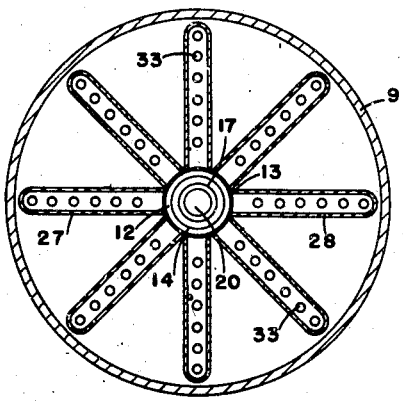

A top sectional view taken across the line III—III of one of the hydrocarbon feed inlet ports is shown in Fig. 3.

In Fig. 1, numeral 11 designates a conduit through which a hydrocarbon feed stock preheated by a means, not shown, is conducted to the reaction zone 9 containing catalyst bed 10. The hydrocarbon feed stock may be prepared by any of the means well known to the art and may comprise a concentrate of a normal paraffin, such as normal butane, if it is desired to produce mono-olefins such as normal butylenes. If the dehydrogenation reaction is to be carried out for the production of a diene, such as butadiene, the feed stock may be olefins of the nature of normal butylenes. Other feed stocks may be employed in the present invention such as normal paraffins or normal olefins having more than 4 carbon atoms, or aromatic hydrocarbons having alkyl groups of two or more carbon atoms attached to the benzene nucleus. In the latter case, for example, it may be desired to dehydrogenate ethyl benzene to produce styrene.

The hydrocarbons feed stock passing through conduit 11 may be preheated by any means well known to the art and as a rule is preferably heated up to temperatures somewhat below those desired in the eventual dehydrogenation operation. Passing downwardly through conduit 11, the hydrocarbon feed stock is divided into several streams, a portion of which enters ports, such as 12 and 13, which conduct the hydrocarbons to a series of feed nozzles in legs 27 and 28 attached to each port to distribute hydrocarbons throughout the catalyst zone in a manner to be described in more detail hereinafter. Another portion of the hydrocarbons not entering through ports 12 and 13 passes downwardly through conduit 14 which may be of somewhat smaller diameter than that of conduit 11. Again the hydrocarbon stream passing through conduit 14 is divided into separate streams which enter a series of ports, such as 15 and 16, conducting the hydrocarbons to a lower section of the catalyst zone and another portion passing downwardly through conduit 17. Further portions of hydrocarbons leaving conduit 17 are divided between ports 18 and 19 and conduit 20. The remaining hydrocarbon stream passing through line 20 is distributed between ports, such as those at 21 and 22.

It is seen from the attached drawing that the conduits 11, 14, 17 and 20 have progressively decreasing diameters and that progressively smaller amounts of hydrocarbons flow through each conduit. By this arrangement, the hydrocarbon stream is divided into four separate streams, each of which may be equally distributed between the above mentioned ports at different levels in catalyst zone 10.

Diluent entering conduit 23, such as steam, nitrogen, carbon dioxide, methane, or flue gas or mixtures thereof, preferably is preheated by some means, not shown, to a temperature above the active dehydrogenation temperature desired in the catalyst zone. Leaving conduit 23, the diluent enters a manifold 24 which may comprise a circular conduit having attached thereto a series of outlet means and distribution shoes designated respectively by numerals 25 and 25A for conducting the diluent to the catalyst zone. This manifolding arrangement will be described in more detail hereinafter. The heated diluent is distributed evenly over catalyst zone 10 by passing through the series of distribution shoes and downwardly to contact hydrocarbons forced into the catalyst zone through the feed nozzles previously described. It will be noted that in this particular illustration the catalyst zone is divided into 4 sections which conveniently may be termed catalyst zones 26a, 26b, 26c, and 26d. In this particular arrangement, the entire stream of diluent entering conduit 23 is distributed evenly over the inlet to catalyst zone 10, the entire portion passing continuously through the aforesaid catalyst zones to the outlet of the reactor. The hydrocarbon feed, however, entering through ports 12 and 13 to the series of nozzles spaced along legs 27 and 28 may represent only about one-fourth of the total hydrocarbons charged to conduit 11. Legs 27 and 28 represent only two of a series of such legs which will permit a fairly uniform distribution of hydrocarbons to the top of catalyst zone 26a. The diluent and hydrocarbons are intimately mixed in zone 26a and represent a relatively high ratio of diluent to hydrocarbons. Leaving zone 26a, the mixture of diluent and hydrocarbons enters zone 26b wherein it is admixed with further quantities of hydrocarbon feed stock forced into the catalyst zone through legs 29 and 30. Since the quantity of hydrocarbons charged into these legs through ports 15 and 16 is approximately equal to that amount charged to zone 26a, the effective diluent to hydrocarbon mixture in zone 26b will be somewhat lower than that in the aforementioned zone.

Leaving zone 26b the mixture of hydrocarbons and diluent containing any products of the dehydrogenation reaction taking place in zones 26a and 26b pass into catalyst zone 26c wherein additional quantities of fresh hydrocarbon feed are added to the total mixture. Likewise, in zone 26d, the fresh hydrocarbons entering ports 21 and 22 are distributed over that portion of the catalyst bed and mixed with the diluent and hydrocarbons leaving zone 26c. The total reactor effluent leaving catalyst zone 26d passes through conduit 31 to a suitable quenching and recovery system. Catalyst bed 10 may be supported by a suitable support 32 which may comprise a grid or other means of supporting the catalyst and of allowing the effluents from the catalyst zones to pass out of the reactor.

Fig. 2 showing a sectional view, II—II of the diluent distribution means, will now be explained in more detail. As mentioned previously, the diluent enters manifold 24 through line 23. Manifold 24 may be any suitable conduit which will allow the diluent to be conducted over the various parts of the catalyst bed. For example, it may be a conduit having approximately the same diameter as conduit 23 forming a circle around hydrocarbon inlet 11. Attached to the bottom of manifold 24 may be a plurality of equally spaced outlets 25 conducting the diluent to a series of distribution means 25a as described before. In this particular example, the distribution of the diluent is accomplished by passing equal portions of the diluent through eight outlets into eight distribution shoes which permit uniform distribution of the diluent over catalyst bed 26a. Obviously, other means of injecting the diluent into the catalyst zone may be equally satisfactory. For example, a series of nozzles placed around manifold 24 may be employed effectively for spraying the diluent over the catalyst zone. In some cases, it may be preferable to employ a series of manifolds leading to various parts of the catalyst zone for accomplishing the distribution of the diluent. Many other effective means of conducting the diluent to the catalyst zone will be obvious to those skilled in the art.

Fig. 3 shows a section, III—III, of a spider-leg arrangement for conducting the hydrocarbons to the catalyst zone. Hydrocarbons passing through conduit 11 enter a series of spider legs, such as 27 and 28, through ports, such as 12 and 13. In this particular illustration, eight spider legs are shown, the bottom and sides of each of which may have a series of uniformly distributed nozzles or small outlets. Hydrocarbons entering each leg of the spider arrangement are forced downwardly through the nozzles, such as illustrated by 33 into catalyst zone 26a. Similarly, spider-leg arrangements are employed for injecting the hydrocarbons into zone 26b, 26c, and 26d. If desired, the spider legs may be staggered in the four different zones so that a more uniform mixing of the diluent and hydrocarbons may be effected.

It is obvious that other methods of conducting the hydrocarbons to the various catalyst zones may be employed effectively. For example, separate lines attached to a common manifold may be attached to reactor 9 at spaced points along the reactor. These separate lines would allow the hydrocarbons to be conducted to some distribution means in each section of the catalyst zone such as that already described. My invention is not limited to various modes of introducing the diluent and hydrocarbons into the several catalyst zones. Any method which will accomplish the introduction of essentially all of the diluent to the inlet of a catalyst zone and the introduction of various portions of the hydrocarbons at spaced points throughout the catalyst zones will accomplish the desired result.

Obviously, as few as two points of injection of hydrocarbons into various portions of the catalyst zone may be employed. If desired, as many as 10 or more injection points throughout the catalyst zone may be employed for introducing the hydrocarbons thereto. The diluent to hydrocarbon ratio maintained in the various portions of the catalyst bed will vary depending on the type of hydrocarbon being dehydrogenated as well as the particular catalyst utilized. The ratio at the inlet to the catalyst zone may be as high as 50 to 1 or higher and progressively decrease to as low as 5 to 1 at the catalyst zone outlet. In some cases, it may even be desired to have diluent to hydrocarbon ratios as low as 1 to 1 at the outlet of the catalyst zone. It will be obvious to those skilled in the art that the progressively decreasing diluent to hydrocarbon ratio maintained in the catalyst zone may be regulated by varying the amounts of hydrocarbons charged to the inlet ports at the various levels in the catalyst zone.

It is also pointed out that a series of fluidly connected reactors of design similar to that shown in Fig. 1 may be employed in carrying out my invention. If this is the case, it is possible to employ the reactors in dehydrogenation and regeneration cycles. Thus, one reactor may be employed for a certain length of time under dehydrogenation reaction conditions until the catalyst becomes deactivated by deposition of carbonaceous materials, while the other reactor containing an inactive dehydrogenation catalyst may have passed through it a material for removing the carbonaceous deposit therefrom. The cycle may then be reversed so that the first reactor is employed for the regeneration cycle while the second reactor is employed for the dehydrogenation cycle. Regeneration of the catalyst may be accomplished by use of air or other oxygen-containing gases or it may be accomplished by using steam at relatively high temperatures.

It is realized that the dehydrogenation of hydrocarbons is usually an endothermic reaction, and hence, it is necessary to maintain the desired reaction temperature throughout the catalyst bed. It is expected that a certain temperature gradient will exist between the inlet and the outlet of the catalyst zone; however, it is usually desired to maintain this gradient at a minimum. One means of preventing an undue temperature drop in the catalyst zone would be to charge the diluent to the reaction zone at temperatures considerably above those normally employed in the dehydrogenation reaction, while at the same time charging the hydrocarbons at selected points along the catalyst bed at non-thermal degrading temperatures. Although the temperature in the upper portion of the catalyst zone may be somewhat higher than normally employed in the dehydrogenation reaction, the high diluent to hydrocarbon ratio existing in this upper catalyst zone will prevent excessive thermal degradation of the hydrocarbons and additional heat is available throughout the remainder of the catalyst zone to offset the loss resulting from the endothermic reaction.

As an example of the desirability of employing my improved process for dehydrogenating hydrocarbons, the following is given:

In a conventional type reactor containing a catalyst comprising a major portion of magnesium oxide and minor portions of iron, potassium and copper oxides, a 3-foot catalyst bed depth is employed. A normal butylenes concentrate comprising 90% normal butylenes is admixed with 10 volumes of steam and the mixture is passed through the catalyst bed at a temperature of 1175° F. and a space velocity of 300 V/V/hr. A conversion of butylenes to butadiene of 30% and a selectivity of 70% is obtained. For each volume of normal butylene charge, 0.189 volume of butadiene is produced.

Employing the same feed stock, catalyst, and reaction conditions in my process, the entire quantity of steam is introduced in the inlet to the reaction zone and the normal butylenes are introduced in four equal proportions throughout the catalyst zone. One portion of the normal butylenes is introduced in the top of the catalyst zone, one 6 inches, one 12 inches, and one 18 inches below the surface of the catalyst. At the point of introduction of the first portion of the normal butylenes, the steam to hydrocarbon ratio is 40:1. This steam to hydrocarbon ratio results in a marked improvement in conversion and in selectivity. In the 6 inches of catalyst bed spaced directly below the uppermost inlet port, approximately 1/5 of the reaction that occurs in a 36-inch reactor takes place. Therefore, at a conversion of 60% and a selectivity of 80% which normally would take place in a 36-inch bed at this high steam to hydrocarbon ratio, 12% of the butylenes are converted in the 6-inch bed and a total butadiene production of 0.0216 part is realized.

In the 6-inch section of catalyst bed between the second and third entrance entrance ports, 0.0338 part of butadiene are produced at 50% conversion and 80% selectivity with 1/5 the reaction occurring that would normally occur in the total reaction zone. Similarly, 0.0387 part of butadiene is produced in the space between the third and fourth entrance ports for a 40% conversion and 80% selectivity, and 0.1126 part of butadiene are produced in the 18 inches of catalyst bed below the fourth entrance port at a 30% conversion and 80% selectivity. This results in a total butadiene production of 0.2068 part as compared with 0.189 part for the conventional reactor, an increase of about 10%.

It is seen that while in the conventional reactor, the steam to hydrocarbon ratio was maintained at 10:1 throughout the catalyst zone, in my improved process the steam to hydrocarbon ratio may reach as high as 40:1 or higher and is never below the steam to hydrocarbon ratio that would normally be obtained in the conventional reaction zone. In other words, for the same amount of diluent charged to the reaction zone, it is possible to maintain a much higher effective diluent to hydrocarbon ratio throughout a greater part of the catalyst zone.

As catalysts for use in this invention, any of those well known to the art for the dehydrogenation of various types of hydrocarbons may be employed. For example, in dehydrogenating monoolefins in the presence of steam, a catalyst comprising magnesium oxide as a base material and iron oxide as an active ingredient along with a small amount of alkali or alkaline earth promoter may be employed. The catalyst may also contain a small amount of a stabilizer which may consist of an oxide of a metal of the right-hand side (transition property) of group I, II and III of the periodic system. Other catalysts may comprise bauxite impregnated with a hydroxide or oxide of barium and strontium. My invention is not to be construed as limited to any particular type of hydrocarbon feed stock, catalyst or diluent but, on the other hand, embodies a process for carrying out a dehydrogenation reaction in the presence of a diluent in which it is possible to maintain a high effective diluent to hydrocarbon ratio in the catalyst zone without, at the same time, requiring additional quantities of diluent above those employed in conventional processes.

Having fully described and illustrated the present invention, what I desire to claim is:

1. A process for catalytically dehydrogenating hydrocarbons in the presence of a diluent which comprises preheating a stream of hydrocarbons and a stream of fluid diluent to active dehydrogenation temperatures, said diluent stream being in excess of said hydrocarbon stream, charging the stream of preheated diluent to the inlet of a catalyst zone containing a bed including an active dehydrogenation catalyst, charging the preheated hydrocarbon stream into the catalyst zone at a plurality of points between the inlet and outlet of said zone, admixing the hydrocarbon streams with diluent at said plurality of selected points in the catalyst zone, and maintaining a progressively decreasing ratio of diluent to hydrocarbons as the mixture passes through the catalyst zone.

2. A process in accordance with claim 1 in which the hydrocarbon is an olefin and the diluent is steam.

3. A process in accordance with claim 1 in which the progressively decreasing ratio of diluent to hydrocarbons maintained in the catalyst zone is in the range of from 50:1 to 5:1.

4. A process for catalytically dehydrogenating hydrocarbons in the presence of a diluent which comprises preheating a stream of hydrocarbons to a temperature below the active dehydrogenation temperature, preheating a fluid diluent to temperatures above an active dehydrogenation temperature, said diluent stream being in excess of said hydrocarbon stream, charging the stream of preheated diluent to the inlet of a catalyst zone containing a bed including an active dehydrogenation catalyst, dividing the preheated hydrocarbons into a plurality of streams, charging the plurality of hydrocarbon streams into the catalyst zone at selected points between the inlet and outlet of said zone, admixing the hydrocarbon streams with said heated diluent at said selected points in the catalyst zone, maintaining a progressively decreasing ratio of diluent to hydrocarbons from the inlet to the outlet of said catalyst zone, and withdrawing from the catalyst zone an effluent comprising products of the dehydrogenation reaction.

5. A process in accordance with claim 4 in which the hydrocarbon is an olefin and the diluent is steam.

6. A process in accordance with claim 4 in which the progressively decreasing ratio of diluent to hydrocarbons maintained in the catalyst zone is in the range of 50:1 to 5:1.

7. A process for catalytically dehydrogenating a normal mono-olefin having more than 3 carbon atoms in the presence of steam in which a catalyst unsusceptible to deactivation by steam is employed which comprises separately preheating a stream of said mono-olefins to a temperature below active dehydrogenation temperatures, preheating a stream of steam to a temperature above active dehydrogenation temperature, said steam being in excess of said olefins, charging the stream of preheated steam to the inlet of a catalyst zone containing a bed including an active dehydrogenation catalyst, dividing said preheated mono-olefins into a plurality of streams, charging the plurality of mono-olefin streams into the catalyst zone at selected points between the inlet and outlet of said zone, admixing the mono-olefin streams with steam at said selected points in said catalyst zone, maintaining a progressively decreasing ratio of steam to mono-olefins from the inlet to the outlet of said catalyst zone, and withdrawing from the catalyst zone an effluent comprising diolefins.

8. A process in accordance with claim 7 in which the normal mono-olefins are normal butylenes and the diolefin is butadiene.

9. A process in accordance with claim 7 in which the progressively decreasing ratio of diluent to hydrocarbons maintained in the catalyst zone is in the range of 50:1 to 5:1.

10. A process in accordance with claim 7 in which the catalyst zone comprises a bed of magnesium, iron and potassium oxides.

CHARLES J. G. LEESEMANN.

REFERENCES CITED

The following references are of record in the file of this patent:

UNITED STATES PATENTS

| Number | Name | Date |
| --- | --- | --- |
| 2,331,427 | Schulze et al | Oct. 12, 1943 |
| 2,366,805 | Richker | Jan. 9, 1945 |
| 2,367,623 | Schulze et al | Jan. 16, 1945 |
| 2,391,117 | Ayres | Dec. 18, 1945 |
| 2,395,875 | Kearby | Mar. 5, 1946 |